(12) United States Patent
Cerrina et al.

(10) Patent No.: US 7,072,500 B2
(45) Date of Patent: Jul. 4, 2006

(54) IMAGE LOCKING SYSTEM FOR DNA MICRO-ARRAY SYNTHESIS

(75) Inventors: Francesco Cerrina, Madison, WI (US); Mo-Huang Li, Madison, WI (US); Chang-Han Kim, Madison, WI (US)

(73) Assignee: Wisconsin Alumni Research Foundation, Madison, WI (US)

( * ) Notice: Subject to any disclaimer, the term of this patent is extended or adjusted under 35 U.S.C. 154(b) by 287 days.

(21) Appl. No.: 10/841,847

(22) Filed: May 7, 2004

(65) Prior Publication Data
US 2005/0249396 A1 Nov. 10, 2005

(51) Int. Cl.
*G06K 9/00* (2006.01)
(52) U.S. Cl. ...................... 382/128; 382/151
(58) Field of Classification Search ............. 382/128, 382/129, 133, 151, 181, 209; 422/131
See application file for complete search history.

(56) References Cited

U.S. PATENT DOCUMENTS

| | | | |
|---|---|---|---|
| 6,375,903 B1 | 4/2002 | Cerrina et al. | |
| 6,544,698 B1* | 4/2003 | Fries | 430/22 |
| 6,768,820 B1* | 7/2004 | Yakhini et al. | 382/289 |
| 6,998,219 B1* | 2/2006 | Fries | 430/311 |
| 2002/0146847 A1* | 10/2002 | Lamont et al. | 436/518 |

OTHER PUBLICATIONS

Kerth et al, "Excimer Laser Projection Lithography on a Full-Field Scanning Projection System" IEEE, p. 299-301, 1986.*

* cited by examiner

*Primary Examiner*—Jingge Wu
*Assistant Examiner*—Tom Y. Lu
(74) *Attorney, Agent, or Firm*—Foley & Lardner LLP (57) ABSTRACT

An image locking system for DNA micro-array synthesis provides a feedback system to stabilize or lock the image with respect to an image capture device, such as a camera and/or microscope. The image locking system includes the use of detection or reference marks. When a shift in image position is detected, a correction signal is sent to one of two mirrors, moving the image to correct for the shift in image position. The system comprises a first light beam directed towards a micromirror device that forms an alignment pattern on a reaction cell and a second light beam directed towards the micromirror device that forms a micro-array image on an active surface of the reaction cell. A camera captures the alignment pattern and an alignment mark. A computer calculates a correction signal to realign the alignment pattern with the alignment mark when movement is detected.

46 Claims, 12 Drawing Sheets

Misalignment  Correct Alignment

IMAGE LOCKING SYSTEM FOR DNA MICRO-ARRAY SYNTHESIS

STATEMENT OF GOVERNMENT RIGHTS

This invention was made with United States Government support awarded by the following agencies: DARPA DAAD 19-02-2-0026. The United States has certain rights in this invention.

FIELD OF THE INVENTION

The present invention relates generally to the field of DNA micro array and synthetic DNA strands manufacturing. More particularly, the present invention relates to an image locking system for DNA micro-array synthesis.

BACKGROUND OF THE INVENTION

Researchers believe that thousands of genes and their products (i.e., RNA and proteins) in a given living organism function in a complicated and orchestrated way. However, traditional methods in molecular biology generally work on a "one gene in one experiment" basis, which means that the throughput is very limited and the "whole picture" of gene function is hard to obtain. In the past several years, a new technology, called DNA microarray, has attracted tremendous interests among biologists. This technology attempts to monitor the whole genome on a single chip so that researchers can have a better picture of the interactions among thousands of genes simultaneously.

An array is an orderly arrangement of samples. It provides a medium for matching known and unknown DNA samples based on base-pairing rules and automating the process of identifying the unknowns. An array experiment can make use of common assay systems, such as microplates or standard blotting membranes, and can be created by hand or make use of robotics to deposit the sample. In general, arrays are described as macroarrays or microarrays, the difference being the size of the sample spots. Macroarrays contain sample spot sizes of about 300 microns or larger and can be easily imaged by existing gel and blot scanners. The sample spot sizes in microarray are typically less than 200 microns in diameter and these arrays usually contains thousands of spots. Microarrays require specialized robotics and imaging equipment that generally are not commercially available as a complete system.

DNA microarray, or DNA chips, are fabricated by high-speed robotics, generally on glass but sometimes on nylon substrates, for which probes with known identity are used to determine complementary binding, thus allowing massively parallel gene expression and gene discovery studies. An experiment with a single DNA chip can provide researchers information on thousands of genes simultaneously—a dramatic increase in throughput.

In the process of manufacturing DNA micro array and synthetic DNA strands, an image is repeatedly projected on the substrate. While the substrate is not moved during processing, the images need to be kept stable across different phases of exposure that may last a total of 4–8 hours. During this time, the optical system drifts from its reference state because, for instance, of changes in the environment. It is not practical to try to completely eliminate these drifts. As such, there is a need for a feedback system to stabilize or lock the image used in the DNA micro array and strands manufacturing.

SUMMARY OF THE INVENTION

In accordance with the present invention, an image locking system for DNA micro-array synthesis provides a feedback system to stabilize or lock the image with respect to an image capture device, such as a camera and/or microscope. The image locking system includes the use of detection or reference marks. When a shift in image position is detected, a correction signal is sent to one of two mirrors, moving the image to correct for the shift in image position.

In an exemplary embodiment, the image locking system includes a reaction cell with an active surface on which a micro-array may be formed, a micromirror device, an alignment mark located at the reaction cell, a second light beam that is directed towards the micromirror device forming an alignment pattern on the reaction cell, a camera that captures an alignment image that comprises the alignment mark and the alignment pattern, a computer that identifies a change in the alignment image and calculates a correction signal to remove the change from the alignment image, and at least one actuator provided to adjust the alignment image in response to the correction signal calculated by the computer. The micromirror device is formed of an array of electronically addressable micromirrors wherein each micromirror can be selectively tilted between one of at least two positions whereby a first light beam directed towards the micromirror device forms a micro-array image on the active surface of the reaction cell.

In an exemplary embodiment, a method of forming an image locking system comprises projecting a first light beam towards a micromirror device that forms an initial alignment pattern, reflecting the initial alignment pattern along an optical path and onto a reaction cell, capturing an initial alignment image wherein the initial alignment image comprises an alignment mark and the initial alignment pattern projected onto the reaction cell, projecting the first light beam towards the micromirror device that forms a current alignment pattern, reflecting the current alignment pattern along the optical path and onto the reaction cell, capturing a current alignment image wherein the current alignment image comprises the alignment mark and the current alignment pattern projected onto the reaction cell, calculating the displacement between the initial alignment image and the current alignment image, and sending a correction signal to at least one actuator to remove the displacement between the initial alignment image and the current alignment image.

In an alternative embodiment, the method of forming an image locking system comprises projecting a first light beam towards a micromirror device that forms an initial alignment pattern, reflecting the initial alignment pattern along an optical path and onto a reaction cell, capturing an initial alignment pattern image of the initial alignment pattern projected onto the reaction cell, projecting the first light beam towards a micromirror device that forms a current alignment pattern, reflecting the current alignment pattern along the optical path and onto the reaction cell, capturing a current alignment pattern image of the current alignment pattern projected onto the reaction cell, calculating the displacement between the initial alignment pattern image and the current alignment pattern image, and sending a correction signal to at least one actuator to remove the displacement between the initial alignment pattern image and the current alignment pattern image.

Further objects, features and advantages of the invention will be apparent from the following detailed description when taken in conjunction with the accompanying drawings.

BRIEF DESCRIPTION OF THE DRAWINGS

In the drawings:

FIGS. 9(a) and (b) are diagrammatic representations of radiochromic film images formed continuously without image locking.

FIGS. 10(a), (b), and (c) are diagrammatic representations of radiochromic film images performed continuously with and without image locking in accordance with an exemplary embodiment.

FIGS. 11(a) and (b) are diagrammatic representations of a virtual mask layout.

DETAILED DESCRIPTION OF EXEMPLARY EMBODIMENTS

Figure 1:
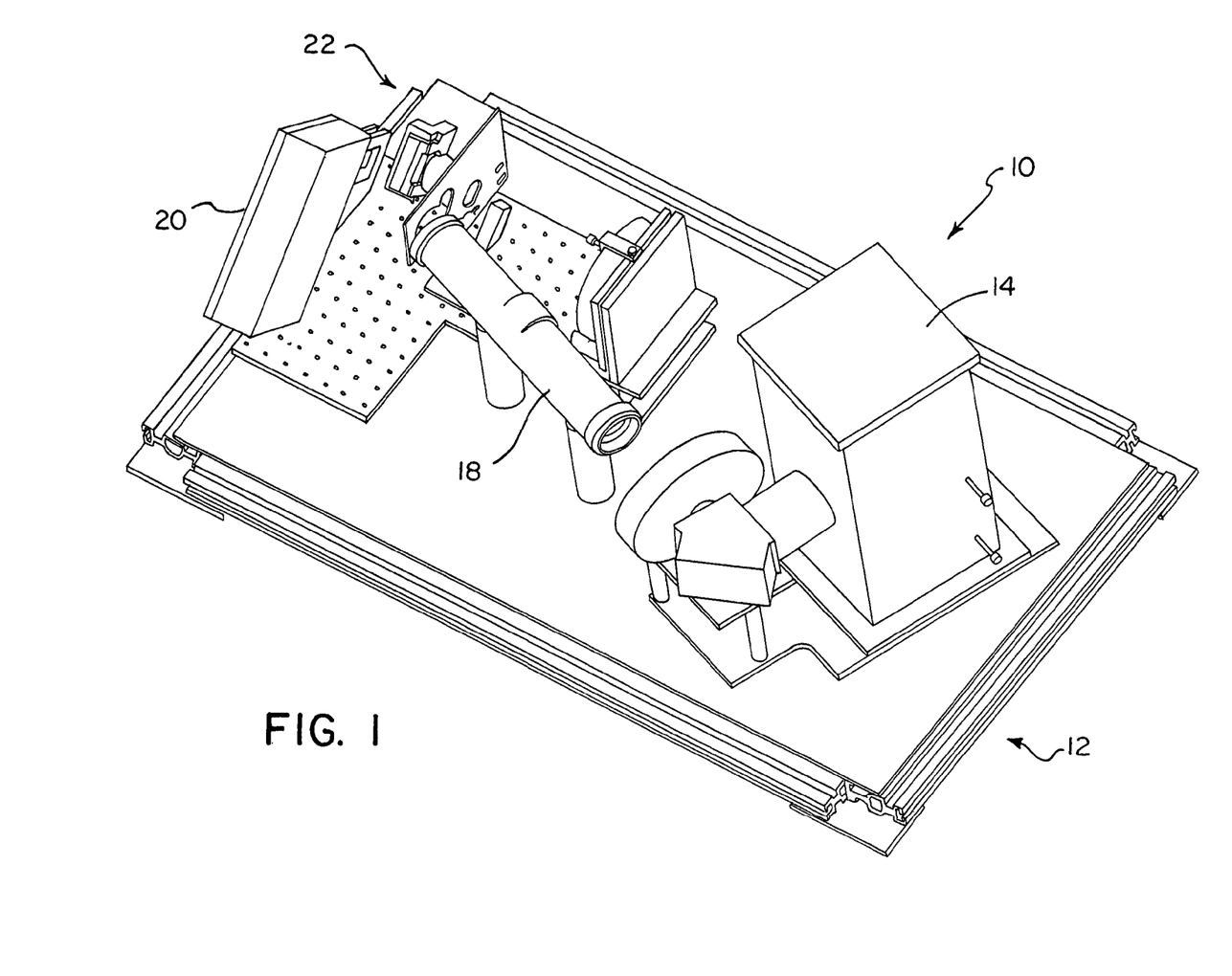
FIG. 1 is a diagrammatic representation of an illumination and optical system of a maskless array synthesizer according to an exemplary embodiment.

FIG. 1 illustrates a schematic of an optical system 10 of a gene synthesizer according to an exemplary embodiment. The system 10 includes a maskless array synthesizer 12 comprising a mercury (Hg) arc lamp 14, a condenser 18, a digital micro-mirror device (DMD) 20, and a microarray reaction cell 22. The digital micromirror device (DMD) 20 may consist of a 1024×768 array of 16 µm wide micromirrors. Preferably, these mirrors are individually addressable and can be used to create any given pattern or image in a broad range of wavelengths. Each virtual mask is generated in a bitmap format by a computer and is sent to the DMD controller, which forms the image onto the DMD 20.

The maskless array synthesizer 12 can generate several µm of drift over several hours due to the thermal expansion of optics parts. The optical path between the DMD 20 and DNA cell 22 is about 1 meter. Due to the thermal expansion caused by the temperature and humidity fluctuation of surrounding environments and also due to ultraviolet (UV) exposure, a slight change of position or rotation of the primary spherical mirror and other optical parts may result. This slight change may cause several µm of drift of the projected image. Since the space between each digital micromirror is only 1 µm, this image drift can cause the projected image to be shifted to expose the UV light at the wrong oligonucleotide spots, generating defects in oligonucleotides sequences and their spatial distribution. An image locking system confines the image shift within a certain range to minimize image drift.

Figure 2:
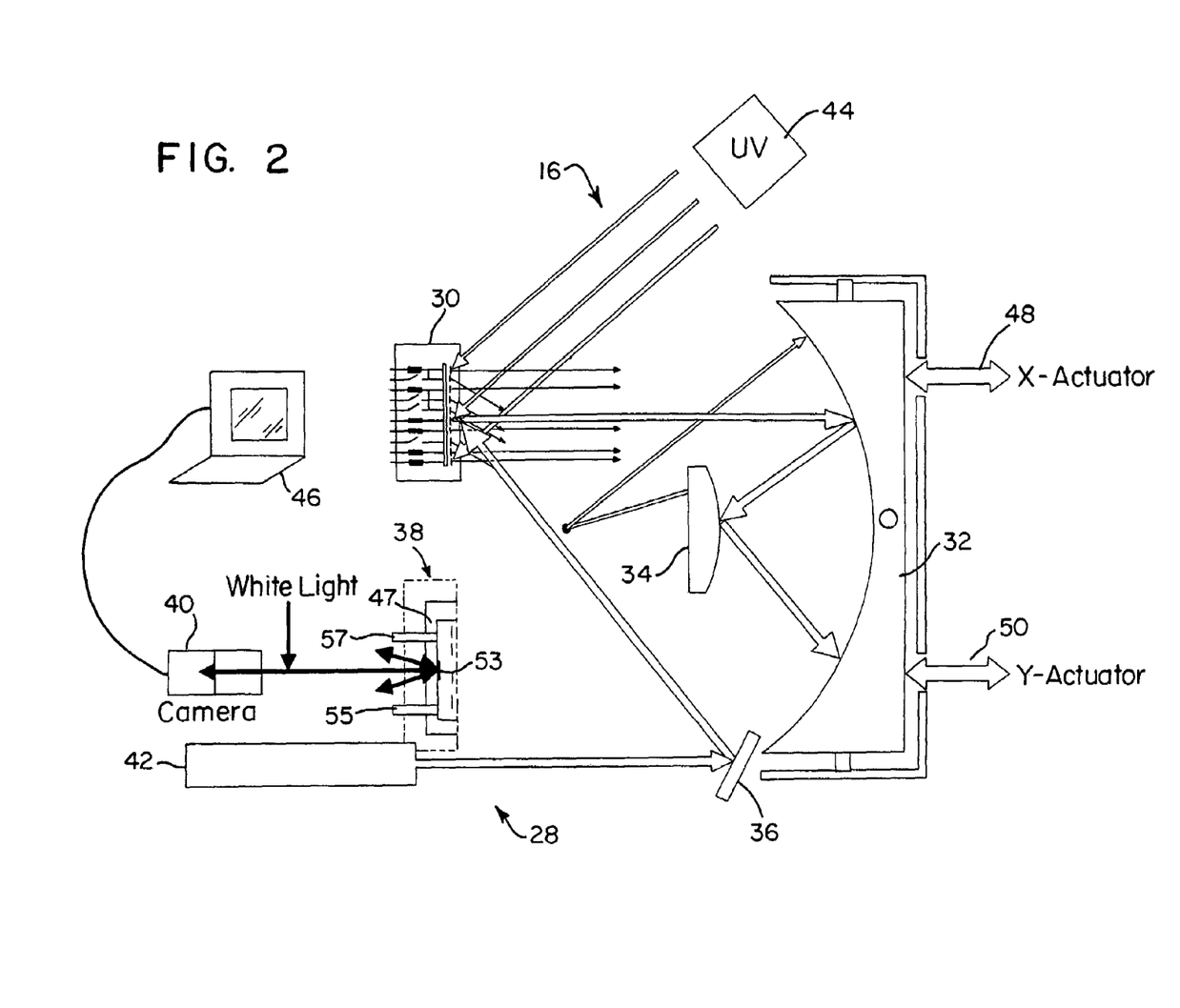
FIG. 2 is a schematic of an image locking system in accordance with and exemplary embodiment.

FIG. 2 illustrates a diagram of an image locking system 28. The image locking system 28 comprises a laser 42, a flat mirror 36, a 1:1 ratio projection system 16, a camera 40, an x-actuator 48, and a y-actuator 50. The 1:1 ratio projection system 16 comprises a UV lamp 44, a digital light processor (DLP) or digital micromirror device (DMD) 30, a concave mirror 32, a convex mirror 34, and a reaction cell 38. The 1:1 ratio projection system 16 forms a UV image of the virtual mask on the active surface of the glass substrate mounted in a flow reaction cell 38 connected to a DNA synthesizer. In an exemplary embodiment, the laser 42 is a He—Ne laser with a wavelength of 632.8 nm (red light) and does not disturb the photochemical reaction of oligonucleotide synthesis. The He—Ne laser beam from the laser 42 is projected to a reaction cell 38 using an "off" state (rotated −10°) of micromirrors without interrupting the current UV exposure system with UV light from the UV lamp 44 which is projected to the reaction cell 38 using an "on" state (rotated 10°) of micromirrors. The He—Ne laser 42 is at the opposite side of the UV lamp 44 with incident angle of −20° into the DMD 30.

The system 28 can be a 0.08 numerical aperture reflective imaging system based on a variation of the 1:1 Offner relay. Such reflective optical systems are described in A. Offner, "New Concepts in Projection Mask Aligners," Optical Engineering, Vol. 14, pp. 130–132 (1975). The DMD 30 can be a micromirror array available from Texas Instruments, Inc. The reaction cell 38 includes a quartz block 47, a glass slide 49, a projected image 51, and a reference mark 53. The UV lamp 44 can be a 1000 W Hg Arc lamp (e.g., Oriel 6287, 66021), which can provide a UV line at 365 nm (or anywhere in a range of 350 to 450 nm). In an alternative embodiment, the lamp 44 may be a visible wavelength lamp.

The laser 42 projects a laser beam onto flat mirror 36 which reflects the beam onto DMD 30. DMD 30 has a two-dimensional array of individual micromirrors which are responsive to the control signals supplied to the DMD 30 to tilt in one of at least two directions. A telecentric aperture may be placed in front of the convex mirror 34.

The camera 40 is a charge coupled device (CCD) camera used to capture an image of alignment marks. The captured image is transferred to a computer 46 for image processing. When a misalignment is detected, correction signals are generated by the computer 46 and sent to actuators 48 and 50 as the feedback to adjust the mirror 32, so that the correct alignment is reestablished. In at least one alternative embodiment, three electro-strictive actuators (instead of actuators 48 and 50) are used to provide minimum incremental movement of 60 nm and control the rotations and movement of the mirror 32. The displacement of the projected image at the glass slide is highly sensitive to the rotations and movement of the mirror 32.

Figure 3:
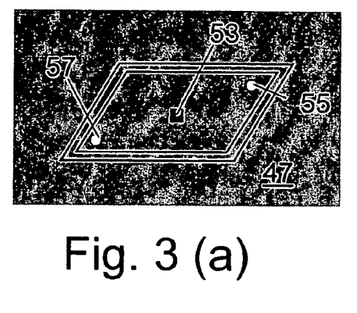
FIG. 3(a) is a diagrammatic representation of a reference mark on a reaction cell.
FIG. 3(b) is a diagrammatic representation of a projected alignment pattern with the reference mark on a glass slide.
FIG. 3(c) is a diagrammatic representation of locations of alignment marks.

FIG. 3(a) illustrates the alignment mark 53 patterned on the quartz block 47 in the reaction cell 38. The quartz block 47 includes an outlet 55 and an inlet 57 through which fluid may flow through the reaction cell 38. Such a reaction cell is described in U.S. Pat. No. 6,375,903 entitled "Method and Apparatus for Synthesis of Arrays of DNA Probes." A predefined micromirror pattern shown in FIG. 3(b) is projected, being centered at the alignment mark 53. In an exemplary embodiment, the projected image 51 is manually aligned at the beginning of synthesis, so that the center of the projected image 51 is roughly overlapped with the center of the alignment mark 53. The CCD camera 40 is used to capture the image that is formed by a 20× (magnification) microscope lens, which is focused at the middle between the reference mark 53 and the projected image 51. An image processing program in the computer 46 calculates the centers of the reference mark 53 and the projected image 51, generating the amount and direction of any displacement, and sending its correction signals to the corresponding actuator(s) 48 and/or 50. The reference mark 53 is patterned on the surface of the quartz block 47 as shown in FIG. 3(a). The relative position of the projected image 51 to the reference mark 53 is shown at FIG. 3(c).

Figure 4:
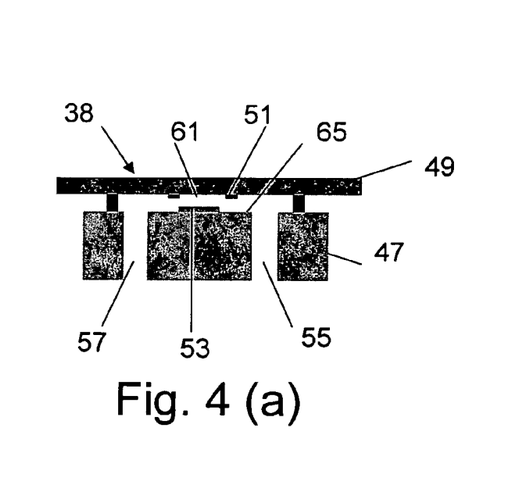
FIG. 4(a) is a cross-section view of a reaction cell with image locking in accordance with an exemplary embodiment.
FIG. 4(b) is a diagrammatic representation of a captured image to be processed in accordance with an exemplary embodiment.
Figure 5A:
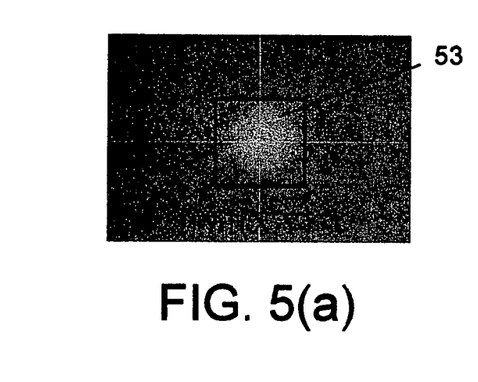
FIGS. 5(a), (b), and (c) are captured images to be processed.
Figure 5B:
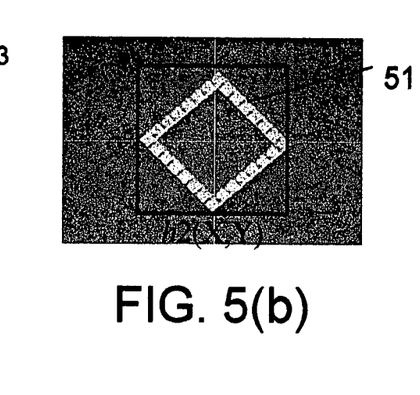
Figure 5C:
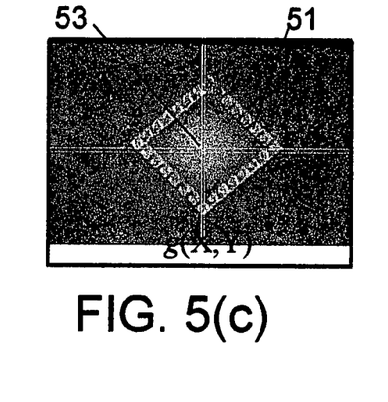

FIG. 4(a) illustrates a cross-sectional view of the reaction cell 38. The projected image 51 is focused on an inner glass slide surface 61 of the glass slide 49 where the oligonucleotides are grown. The reference mark 53 and the projected image 51 are not at the same focus plane. A microscope lens focuses at the middle plane between the reference mark 53 and the projected image 51. As such, the image captured by the camera 40 is blurred, as shown in FIG. 5(c). The gap between the glass slide surface 61 and quartz block surface 65 of the quartz block 47 is 100 μm. To locate the center position of each pattern, an 2D optical pattern recognition technique, which is based on correlation theory, is used. Correlation analysis compares two signals (or images) in order to determine the degree of similarity, where input signal is to be searched for a reference signal. Each correlation gives a peak value where the reference signal and input signal matches the best. If the location of this value is different from the previous value, it means that the image has been shifted, indicating the need of correction.

In an exemplary embodiment, an image processing procedure calculates the image displacement from the images captured by the camera 40, by calculating the cross-correction signals between a captured input image described with reference to FIG. 5(c), the reference mark 53 of FIG. 5(a), and the projected image 51 of FIG. 5(b). The cross-correlation is a measure of the similarity between two images, such as images from FIGS. 5(a) and 5(c) and such as images from FIGS. 5(b) and 5(c). Mathematically, the cross-correlation can be calculated as:

$$c_{gh}(X,Y) = \int_{-\infty}^{\infty}\int_{-\infty}^{\infty} g(x,y)h(x+X, y+Y)dxdy$$

or, using the Wiener-Khintchine Theorem, as:

$$c_{gh}(X,Y) = IFFT(FFT2(g(X,Y)) \cdot FFT2(rot90(h(X,Y))))$$

The new locations of the reference mark and the projected image are marked by correlation peaks (i.e., the highest value of $c_{gh}(X,Y)$). Based on the new locations, correction signals are computed and sent to the actuators to move the mirror. This correction procedure continues until the synthesis is completed.

In an exemplary embodiment, computer programs control the actuators and generate the correction signals by image processing. A log file of displacements can also be recorded and analyzed for measuring actual displacement indirectly and its direction for further refinement of the algorithm. Various mark shapes (e.g., crosses, chevrons, circles) can be used as the reference mark 53.

Figure 6:
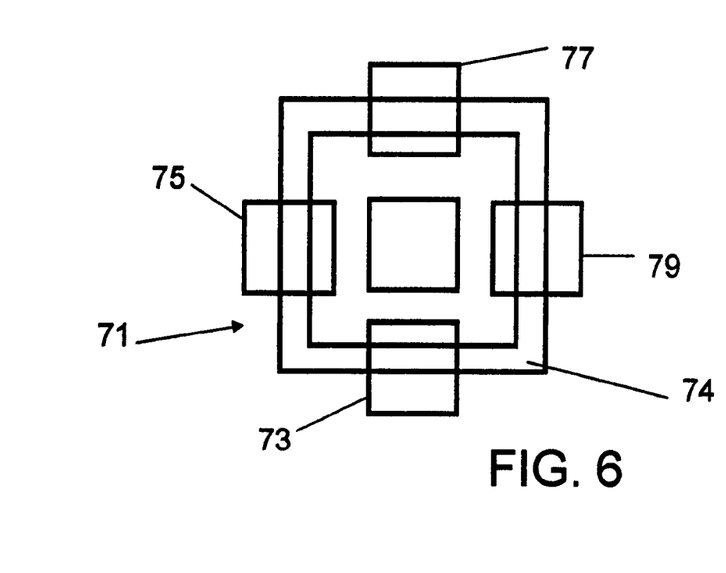
FIG. 6 is a diagrammatic representation of an image projected on a substrate where the image includes several micro-mirrors.
Figure 7:
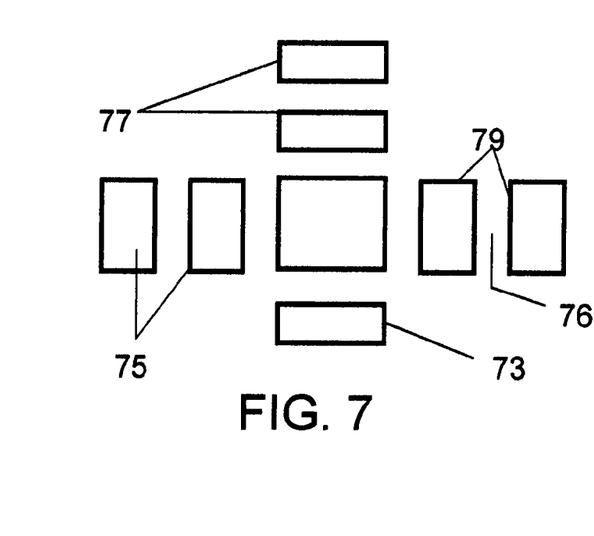
FIG. 7 is a diagrammatic representation of an image projected on a substrate wherein the image of the mask appears as a dark line.

FIG. 6 illustrates an image 71 projected on a substrate where the image includes several micro-mirrors 73, 75, 77, and 79 according to another exemplary embodiment. A reference mark 74 is included on the substrate. In the field of microscope, the micro-mirrors 73, 75, 77, and 79 appear as a bright image while the reference mark 74 can be dark so that the image of the mask will appear as a dark line 76 (FIG. 7). As such, overlap of the micro-mirrors 73, 75, 77, and 79 and the reference mark 74 can be observed. Image processing software can determine if the dark shadows are centered on the micro-mirror and if not, apply a correction.

Since each pixel is approximately 16 μm in size, it is necessary to keep the image locked to less than 200 nm. Since the distance from the concave mirror 32 (FIG. 2) to the reaction cell 38 can be approximately 500 mm, the angle pointing accuracy is $0.4 \times 10^{-6}$ radians. Since the diameter of the optics is 200 mm, a piezoelectric or similar system can be used to generate the angular shift by applying a displacement of 80 nm. Typically, a nanopositioner can control displacements of even 10 nm.

Other designs are possible, involving different schemes for the detection of the displacements. The actuators 48 and 50 can be used to effectively align the optics. In another exemplary embodiment, diffractive marks can also be used, alleviating the need for microscopes. Partially transmitting marks (half toned) can be used for other schemes of detection.

Figure 8:
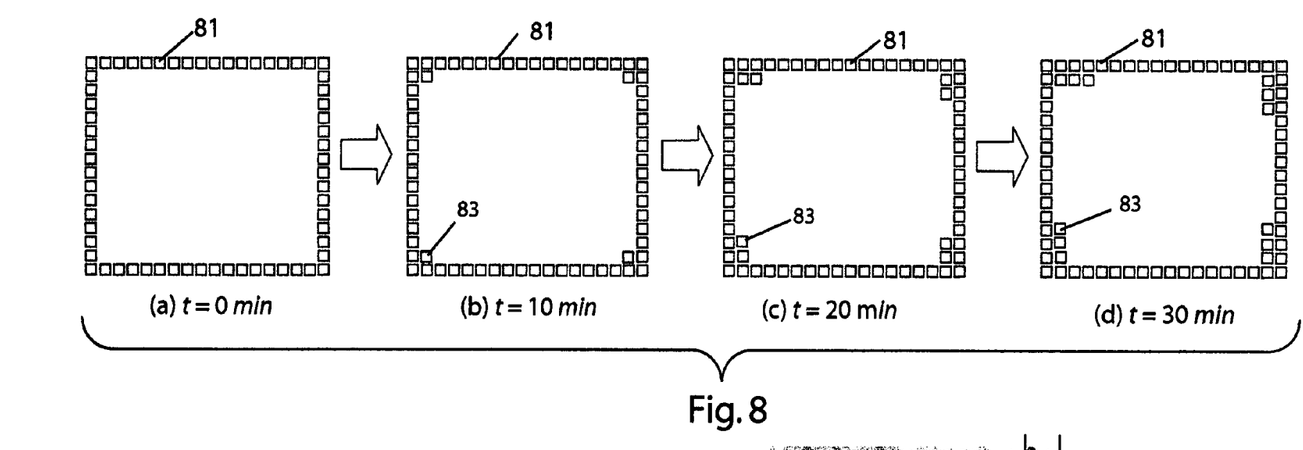
FIG. 8 is a diagrammatic representation of an exposure scheme for performance verification.
Figure 9:
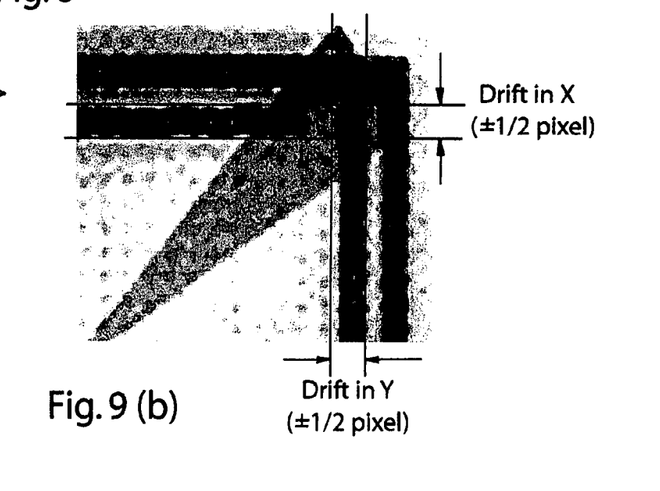
Figure 10:
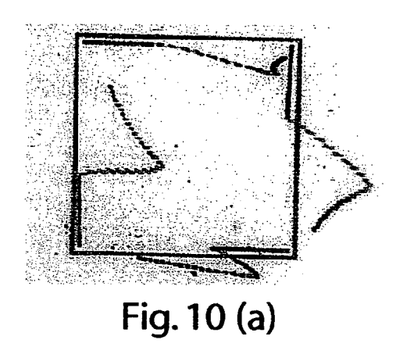

FIGS. 8–10 illustrate the performance of an exemplary image locking system. FIG. 8 illustrates image patterns for measuring drift. In FIG. 8(a), a square shape reference frame 81 is exposed at time equal to zero (t=0). In FIGS. 8(b), (c) and (d), each adjacent pixel of the reference frame 81 is progressively exposed every 10 min to create a line 83. If there is a drift, the gap between the reference frame and the line 83 will change.

FIGS. 9(a) and (b) show the results of a projected image shift as an image is projected without image locking. In one experiment, the ambient temperature around the system was measured to be 23.56±1° C. and the humidity around 23.2%. FIG. 9(b) shows a zigzag displacement is approximately half pixel's size (~8 μm) for 490 minutes exposure. Such a shift can increase to about 50 μm for 24 hour's continuous exposure.

FIGS. 10(a), (b), and (c) show the results of exposing radiachromic film at room temperature for 200 minutes (pixels 1–20), and increasing the environmental temperature by 5° C. for 120 minutes (pixels 21–32). Then, the environmental temperature is reduced back to room temperature for 150 minutes (pixels 33–48). The humidity variation is 11.7% to 16.3% as the temperature change. FIG. 10(a) illustrates the experimental results showing image drift without image locking. However, in FIGS. 10(*b*) and (*c*) with image locking, the image is stable with drift in each direction smaller than 1 μm.

Figure 11:
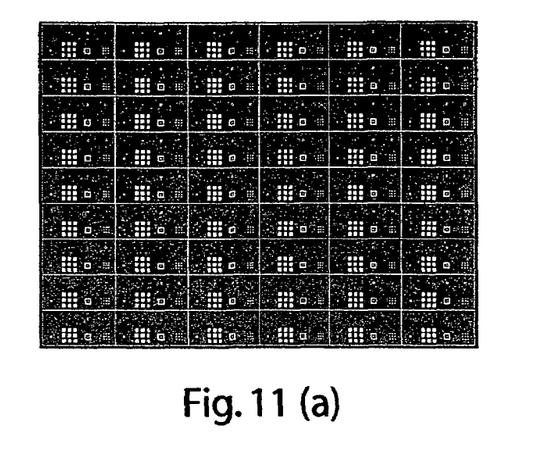

FIGS. 11(*a*) and (*b*) show an exemplary virtual mask layout used to verify the image locking performance. FIG. 11(*a*) shows the entire mask (1024×768) and FIG. 11(*b*) shows one of the sections of the mask that expands to the entire chip. From the upper left corner to the lower right corner, the features are composed of single pixel, 3×3, 5×5 (with interim mirrors off), 1:4 ratio, 5×5 (all pixels on), 3×3 (of 9×9 mirrors), 5×5 (of 3×3 mirrors), 9:36 ratio.

Figure 12:
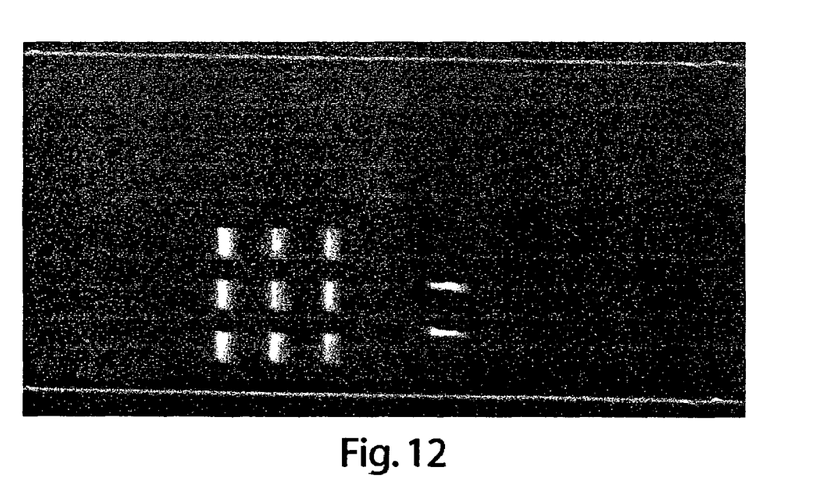
FIG. 12 is a diagrammatic representation of an image of a microarray fabricated without using image locking.

FIG. 12 illustrates a fluorescence image with the synthesized oligomers (25 mer in length) using the virtual mask layout described with reference to FIG. 11, hybridized with their complementary sequences (probes) that has cy3 cyano-nucleotide at its end. The chip is scanned in 2 μm resolution using an applied precision microarray scanner. The target oligomers have an additional 5Ts as a linker on the substrate glass for efficient hybridization.

The small features are not visible in FIG. 12 because they have extremely low fluorescence signal intensity due to the lack of exposure, caused by the image drifting over time. Larger features have a relatively bigger overlapping area of exposure and those areas have target oligonucleotides to be hybridized even though the feature shape is distorted. However, small ones such as in the upper row in FIG. 12 will have progressively smaller amount of exposure as the synthesis advances, resulting in very poor synthesis.

Figure 13:
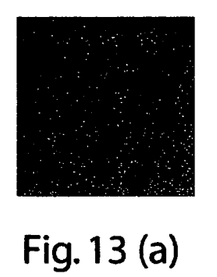
FIGS. 13(a)–(h) are diagrammatic representations of images of a microarray fabricated without using image locking at 10 times magnification.
Figure 14:
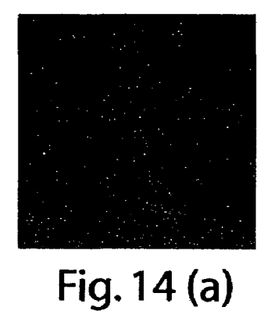
FIGS. 14(a)–(h) are diagrammatic representations of an image of a microarray fabricated without using image locking at 50 times magnification.

FIGS. 13 and 14 show the images of the same features as in FIG. 12, captured by a Nikon Fluorescence Microscope using 10× and 50× lens respectively. In these Figures, the hybridization signal intensities are not comparable to each other because their images are scaled to be seen so that the shapes, directions and amount of the drift can be brought out. Their actual intensity of smaller features are approximately 10,000-fold lower than the bigger ones. The single pixel that doesn't have any adjacent pixels is not detectable due to its extremely low signal and is not shown. In 100 cycles of synthesis, 5 to 6 pixels' displacement occurred in the particular synthesis even though there is no enforced environment change. FIG. 13(*f*) shows the directionality of the drift. Only horizontal features are left, indicating that there is some dominant directions of drift. FIG. 14 shows more magnified images of those shown in FIG. 13 by using a 50× lens instead of a 10× lens.

Figure 15:
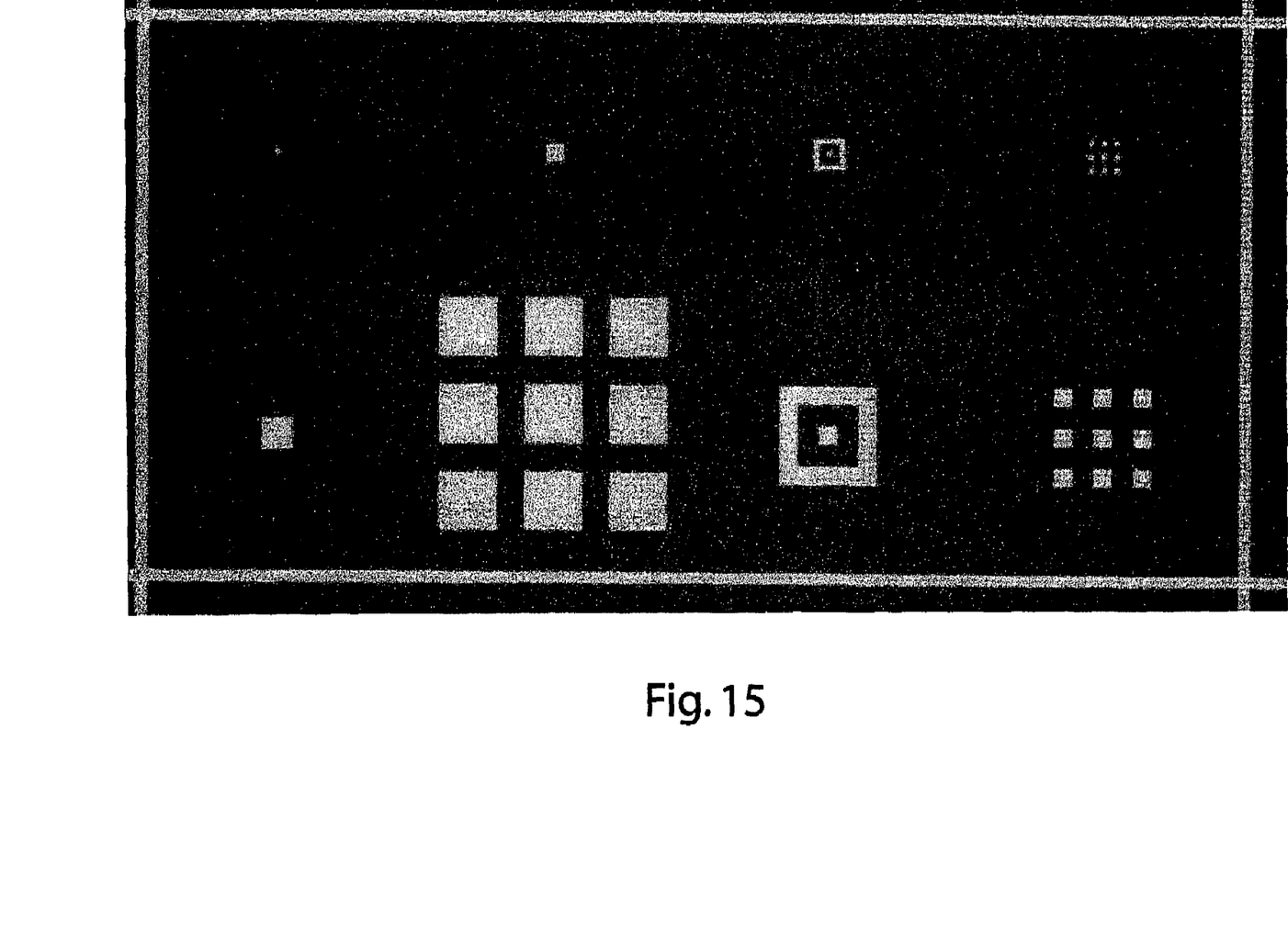
FIG. 15 is a diagrammatic representation of an image of a microarray fabricated using image locking.

FIG. 15 is the scanned image of the DNA chip that was fabricated under the same conditions as the chip in FIG. 12 (without image locking) but where the image locking system is engaged. All the features in the mask layout are visible, keeping their shape (square micromirror shape), even the single pixel. The synthesis images also have maximum hybridization signal intensities.

Figure 16:
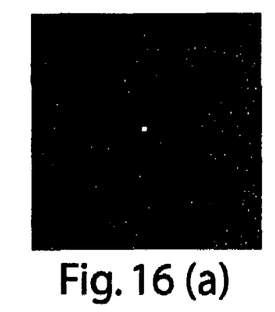
FIGS. 16(a)–(h) are diagrammatic representations of images of a microarray fabricated using image locking in accordance with an exemplary embodiment at 10 times magnification.
Figure 17:
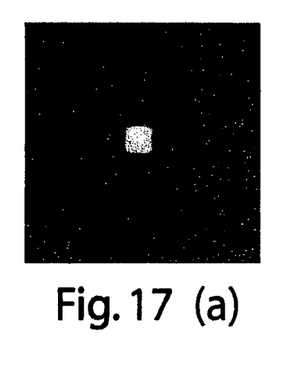
FIGS. 17(a)–(h) are diagrammatic representations of an image of a microarray fabricated using image locking in accordance with an exemplary embodiment at 50 times magnification.

FIGS. 16 and 17 show fluorescence microscope capture images using 10× and 50× respectively. The lanes and the posts of the micromirros are clearly seen, indicating the firm image locking.

It should be understood that the invention is not limited to the embodiments set forth herein as illustrative, but embraces all such forms thereof as come within the scope of the following claims.

What is claimed is:

1. An image locking system for use in DNA micro-array synthesis, the system comprising:
    a reaction cell with an active surface on which a micro-array may be formed;
    a micromirror device, the micromirror device formed of an array of electronically addressable micromirrors wherein each micromirror can be selectively tilted between one of at least two positions whereby a first light beam directed towards the micromirror device forms a micro-array image on the active surface of the reaction cell;
    an alignment mark located at the reaction cell;
    a second light beam that is directed towards the micromirror device thereby forming an alignment pattern on the reaction cell;
    a camera capturing an alignment image, the alignment image comprising the alignment mark and the alignment pattern reflected onto the reaction cell;
    a computer identifying a change in the alignment image and calculating a correction signal to remove the change from the alignment image; and
    at least one actuator provided to adjust the alignment image in response to the correction signal calculated by the computer.

2. The system of claim 1 wherein the micromirror device is formed of a two dimensional array of micromirrors.

3. The system of claim 1 wherein the first light beam is provided by an ultraviolet lamp.

4. The system of claim 3 wherein the ultraviolet lamp is a 1000 watt mercury arc lamp.

5. The system of claim 3 wherein the ultraviolet lamp provides light with a wavelength in a range from 350 nanometers to 450 nanometers.

6. The system of claim 5 wherein the ultraviolet lamp provides light with a wavelength of 365 nanometers.

7. The system of claim 1 wherein the first light beam is provided by a visible wavelength lamp.

8. The system of claim 1 wherein the second light beam is provided by a laser.

9. The system of claim 8 wherein the laser is a He—Ne laser.

10. The system of claim 9 wherein the He—Ne laser provides light with a wavelength of 632.8 nanometers.

11. The system of claim 1 wherein the camera is a charge coupled device camera.

12. The system of claim 1 wherein the at least one actuator is an electro-strictive actuator.

13. The system of claim 12 wherein three electro-strictive actuators are provided.

14. The system of claim 1 wherein the alignment image is formed by a microscope lens.

15. A method of forming an image locking system for use in DNA micro-array synthesis, the method comprising:
    projecting a first light beam towards a micromirror device that forms an initial alignment pattern;
    reflecting the initial alignment pattern along an optical path and onto a reaction cell;
    capturing an initial alignment image wherein the initial alignment image comprises an alignment mark and the initial alignment pattern projected onto the reaction cell;
    projecting the first light beam towards the micromirror device that forms a current alignment pattern;
    reflecting the current alignment pattern along the optical path and onto the reaction cell;
    capturing a current alignment image wherein the current alignment image comprises the alignment mark and the current alignment pattern projected onto the reaction cell;
    calculating the displacement between the initial alignment image and the current alignment image; and sending a correction signal to at least one actuator to remove the displacement between the initial alignment image and the current alignment image.

16. The method of claim 15, wherein the first light beam is provided by a laser.

17. The method of claim 16 wherein the laser is a He—Ne laser.

18. The method of claim 17 wherein the He—Ne laser provides light with a wavelength of 632.8 nanometers.

19. The method of claim 15 wherein projecting the first light beam towards the micromirror device further comprises selectively tilting an array of electronically addressable micromirrors that form the micromirror device wherein each micromirror can be tilted between one of at least two positions wherein a first position for a micromirror defines an on state for the micromirror whereby the first light beam is directed away from the optical path, and a second position for the micromirror defines an off state for the micromirror whereby the first light beam is directed towards the optical path.

20. The method of claim 19 wherein the micromirror device is formed of a two dimensional array of micromirrors.

21. The method of claim 19 further comprising forming a micro-array image on an active surface of the reaction cell by directing a second light beam to the micromirror device wherein the micromirror in the on state reflects the second light beam towards the optical path and the micromirror in the off state reflects the second light beam away from the optical path.

22. The method of claim 21 wherein the micromirror device is formed of a two dimensional array of micromirrors.

23. The method of claim 21 wherein the second light beam is provided by an ultraviolet lamp.

24. The method of claim 23 wherein the ultraviolet lamp is a 1000 watt mercury arc lamp.

25. The method of claim 23 wherein the ultraviolet lamp provides light with a wavelength in a range from 350 nanometers to 450 nanometers.

26. The method of claim 25 wherein the ultraviolet lamp provides light with a wavelength of 365 nanometers.

27. The method of claim 21 wherein the second light beam is provided by a visible wavelength lamp.

28. The method of claim 15 further comprising forming the optical path using a reflective telecentric imaging system comprising a concave mirror and a convex mirror whereby the concave mirror receives light directed towards the optical path and reflects the light towards the convex mirror, the convex mirror receives the light from the concave mirror and reflects the light back towards the concave mirror, and the concave mirror receives the light redirected from the convex mirror and reflects the redirected light onto the reaction cell.

29. The method of claim 28 further comprising moving the concave mirror in response to the correction signal with the at least one actuator.

30. A method of forming an image locking system for use in DNA micro-array synthesis, the method comprising:
projecting a first light beam towards a micromirror device that forms an initial alignment pattern;
reflecting the initial alignment pattern along an optical path and onto a reaction cell;
capturing an initial alignment pattern image of the initial alignment pattern projected onto the reaction cell;
projecting the first light beam towards a micromirror device that forms a current alignment pattern;
reflecting the current alignment pattern along the optical path and onto the reaction cell;
capturing a current alignment pattern image of the current alignment pattern projected onto the reaction cell;
calculating the displacement between the initial alignment pattern image and the current alignment pattern image; and
sending a correction signal to at least one actuator to remove the displacement between the initial alignment pattern image and the current alignment pattern image.

31. The method of claim 30 further comprising capturing an alignment mark image of an alignment mark located at the reaction cell.

32. The method of claim 31 wherein calculating the displacement further comprises:
calculating a first cross correlation between the alignment mark image and the current alignment image;
calculating a second cross correlation between the initial alignment pattern image and the current alignment image;
calculating a reference location from a peak of the first cross correlation;
calculating a current location from a peak of the second cross correlation;
calculating a displacement between the current location and the reference location.

33. The method of claim 30, further comprising forming the optical path using a reflective telecentric imaging system comprising a concave mirror and a convex mirror whereby the concave mirror receives light directed towards the optical path and reflects the light towards the convex mirror, the convex mirror receives the light from the concave mirror and reflects the light back towards the concave mirror, and the concave mirror receives the light redirected from the convex mirror and reflects the redirected light onto the reaction cell.

34. The method of claim 33 further comprising moving the concave mirror in response to the correction signal with the at least one actuator.

35. The method of claim 30, wherein the first light beam is provided by a laser.

36. The method of claim 35 wherein the laser is a He—Ne laser.

37. The method of claim 36 wherein the He—Ne laser provides light with a wavelength of 632.8 nanometers.

38. The method of claim 30 wherein projecting the first light beam towards the micromirror device further comprises selectively tilting an array of electronically addressable micromirrors that form the micromirror device wherein each micromirror can be tilted between one of at least two positions wherein a first position for a micromirror defines an on state for the micromirror whereby the first light beam is directed away from the optical path, and a second position for the micromirror defines an off state for the micromirror whereby the first light beam is directed towards the optical path.

39. The method of claim 38 wherein the micromirror device is formed of a two dimensional array of micromirrors.

40. The method of claim 38 further comprising forming a micro-array image on an active surface of the reaction cell by directing a second light beam to the micromirror device wherein the micromirror in the on state reflects the second light beam towards the optical path and the micromirror in the off state reflects the second light beam away from the optical path.

41. The method of claim 40 wherein the micromirror device is formed of a two dimensional array of micromirrors.

42. The method of claim 40 wherein the second light beam is provided by an ultraviolet lamp.

43. The method of claim 42 wherein the ultraviolet lamp is a 1000 watt mercury arc lamp.

44. The method of claim 42 wherein the ultraviolet lamp provides light with a wavelength in a range from 350 nanometers to 450 nanometers.

45. The method of claim 44 wherein the ultraviolet lamp provides light with a wavelength of 365 nanometers.

46. The method of claim 30 wherein the second light beam is provided by a visible wavelength lamp.

* * * * *